Feb. 26, 1963 W. H. DAWSON, JR., ET AL 3,078,595
SIMULATED RPM SYSTEM FOR PROPELLER-TYPE AIRCRAFT
Filed April 24, 1961 2 Sheets-Sheet 1

INVENTORS
WILLIAM H. DAWSON, JR
DUNCAN W. SIMPSON
BY
*Orin R. Severn*
THEIR ATTORNEY

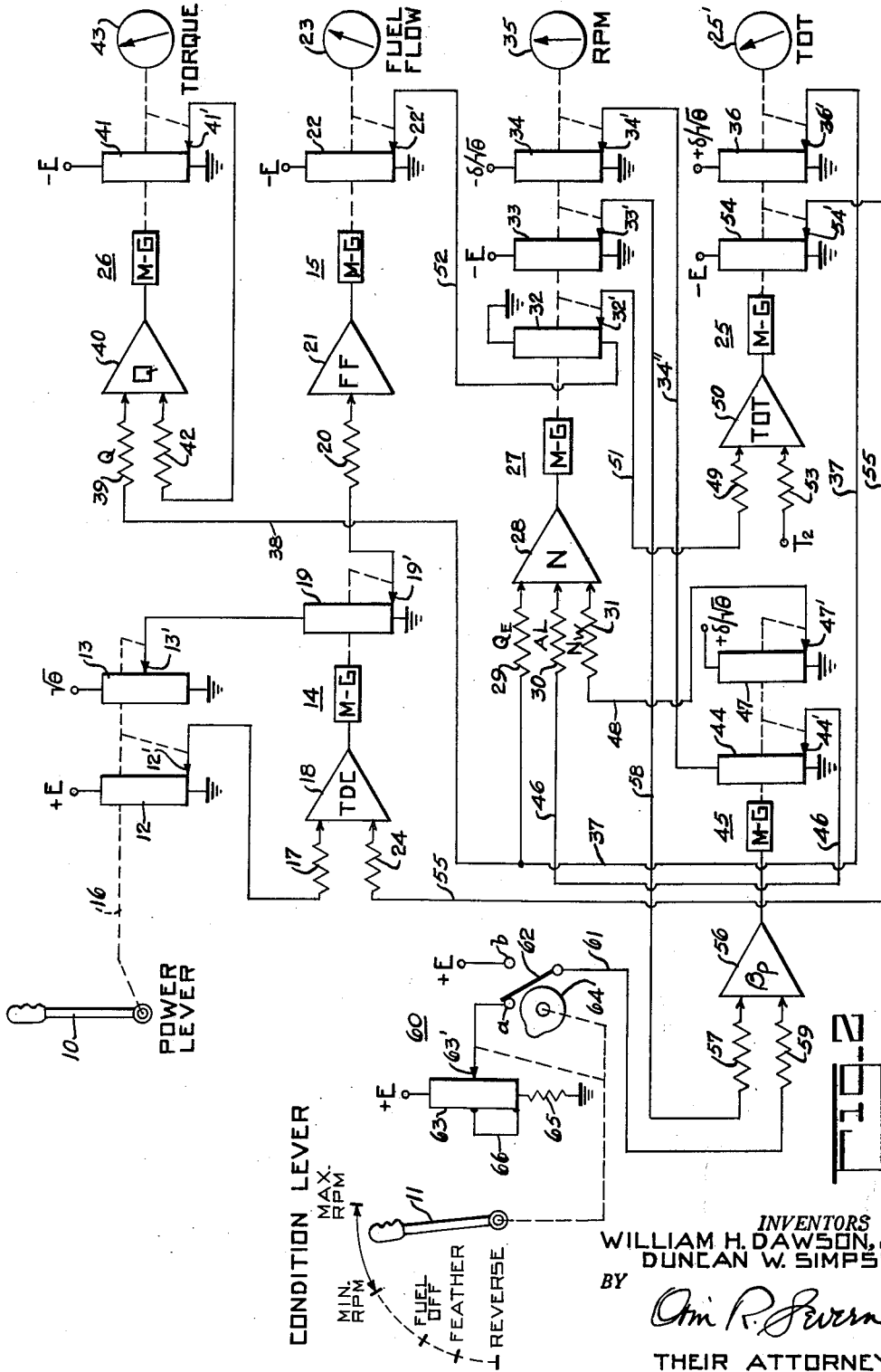

United States Patent Office 3,078,595
Patented Feb. 26, 1963

3,078,595
SIMULATED RPM SYSTEM FOR PROPELLER-
TYPE AIRCRAFT
William H. Dawson, Jr., Waldwick, and Duncan W.
Simpson, Wyckoff, N.J., ass'gnors to Curtiss-Wright
Corporation, a corporation of Delaware
Filed Apr. 24, 1961, Ser. No. 115,841
2 Claims. (Cl. 35—12)

This invention relates to aircraft simulating systems for on-ground training and instruction of aircraft personnel, and concerns in particular a system for simulating the speed or RPM system of propeller type aircraft having any suitable prime mover or engine.

Heretofore, aircraft propeller RPM systems were simulated by taking into account characteristics, often involved, of the aircraft prime mover which in the case of propeller type aircraft might be either a conventional piston type or gas turbine engine. Such simulation was generally complicated and required extensive circuitry, auxiliary switching and a considerable amount of associated apparatus that made the equipment expensive and time-consuming to produce.

The present invention is based on a radically different and simplified approach by treating the propeller shaft per se as the main object of analog simulation. In accordance with the invention basic engine characteristics are ignored, thus confining the analog problem to the three main forces acting on the shaft itself, i.e. (1) the engine driving power or shaft torque, (2) the air load or propeller resistance to shaft rotation and (3) the so-called "wind-milling" force due to airspeed that tends to increase RPM.

A principal object of this invention therefore is to provide an improved aircraft propeller RPM simulating system that is simple and direct in application, flexible and straightforward in design and comparatively inexpensive in cost.

The invention will be more fully set forth in the following description referring to the accompanying drawings, and the features of novelty will be pointed out with particularity in the claims annexed to and forming a part of this specification.

Referring to the drawings,

FIGURE 3 is a graph illustrating propeller RPM and blade angle characteristics during typical operation under forward and reverse control.

A brief description of aircraft propeller operation will first be outlined. Conventional systems operate under a so-called constant RPM schedule wherein the propeller blade angle is changed to absorb varying amounts of power called for by the pilot by means of a primary control, namely the power lever. The governing systems for accomp'ishing this need not be described since the details and the variations thereof are not necessary for an understanding of the present invention. It is sufficient to mention that in one form of control for example the engine fuel governor is related to the blade angle change mechanism so that fuel flow to the engine corresponds to propeller load so as to maintain substantially constant the propeller RPM.

In this instance where a gas turbine is used, the power lever controls blade angle directly within the normal "Beta" range. For governing in the normal RPM range, the power lever controls fuel flow, and the blade angle automatically adjusts to maintain the constant RPM according to the position of the "condition" lever, described below.

A second main control operable by the pilot, namely the condition lever which may be either separate'y operable or mechanically combined with the power lever, provides control of the propeller blade angle ($\beta_p$) for automatic or manual operation, forward and reverse thrust, feathering and fuel cut-off.

Some of the factors which affect propeller indication characteristics include minimum blade angle stops, automatic feathering systems, safety over speed limiting devices, automatic propeller decoupling, emergency negative torque controls, start blade angle setting control, reverse pitch controls, etc.

Figure 1:
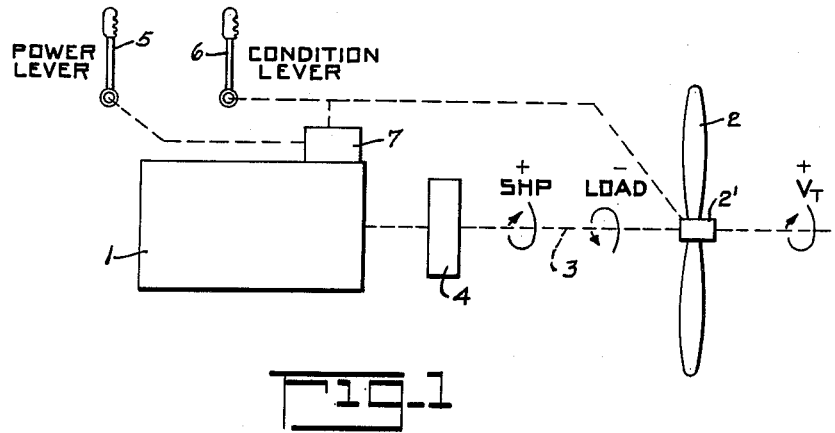
FIGURE 1 is a simplified schematic illustration of an aircraft engine-propeller combination with indicated primary forces acting on the propeller shaft.

Referring to FIGURE 1, a prime mover 1 which may be a piston type or gas turbine engine drives a propeller 2 through a shaft 3. Where a gas turbine is used, a high reduction gearing 4 is connected in the drive between the engine and propeller; also in such cases shaft decoupling apparatus may be used in case of flame-out, or in lieu thereof a so-called "free" turbine having limited mass and inertia. The pilot controls the turbine-propeller set by the power lever 5 and condition lever 6. These are operatively related as indicated, to the pitch changing mechanism 2' and to suitable automatic controls, engine governor, etc., indicated at 7.

As illustrated, three primary forces are shown as acting on the propeller shaft, namely (1) the engine torque or shaft horse power (SHP) which may be considered as positive in sense, acting clock-wise as viewed from the engine, (2) the propeller load which is in opposition to SHP and may be considered negative in sense, acting counter-clockwise and (3) a wind-milling force due to true airspeed ($V_T$) that may be considered positive in sense, acting clockwise. For the analog simulation the basic propeller RPM is determined by considering that there are at all times three torque components acting on the propeller shaft and that when their resultant is zero, the propeller turns at steady-state constant RPM. Summarizing, the components are (1) the engine or gas turbine effort to turn the propeller which is a function of torque output, (2) air load or propeller resistance to rotation which is a function of propeller RPM, blade ang'e and air velocity and density and (3) the wind-milling effect of air speed on turning the propeller which is a function of air-speed, blade angle and air density. Although wind-milling may imply that there is no flame or ignition in the engine, this component in reality is always acting on the propeller whether there is flame or no flame, and hence no ambiguous auxiliary switching is required in the simulating system.

Figure 2:
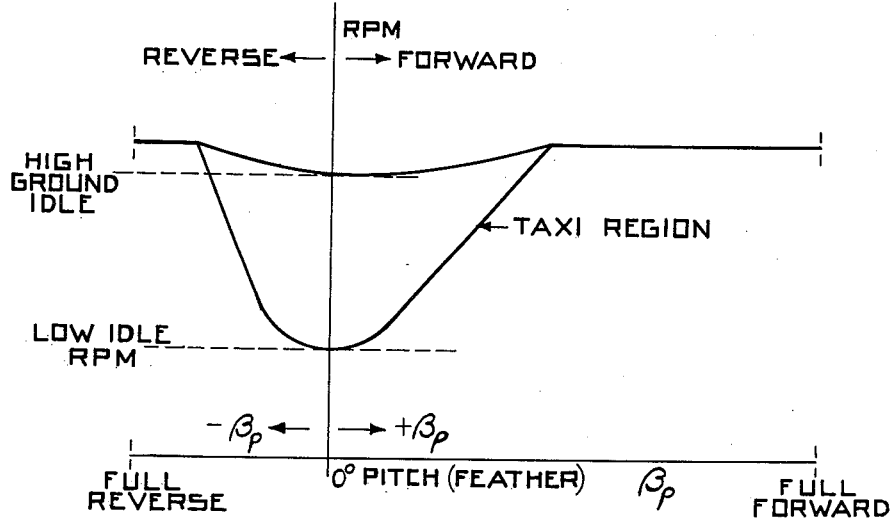
FIGURE 2 is a diagrammatic illustration of analog circuitry used in carrying out the invention.

Referring to FIG. 2 which shows the electrical analog system for computing simulated propeller RPM, the pilot-controlled power and condition levers are indicated at 10 and 11 respectively. The power lever 10 controls signal generators, such as potentiometers (hereinafter for brevity termed "pots") 12 and 13 from which are derived control signals for a temperature datum control (TDC) system and a fuel flow (FF) system generally indicated by 14 and 15 respectively. The power lever pot 12 which is energized at its upper terminal by a constant voltage $+E$ and is grounded at its lower terminal has a slider contact 12' that is operated by the power lever through a mechanical connection indicated at 16. The derived voltage signal at slider 12' is fed through a proportioning resistance 17 to a summing amplifier 18 of the TDC system. The other pot 13 is energized at its upper terminal by a voltage representing $\sqrt{\theta}$, where $\theta$ represents adiabatic temperature ratio. This signal may be derived as shown in Patent No. 2,798,308 granted July 9, 1957, to Stern et al. The lower terminal of the pot is grounded and the derived voltage signal at slider 13' energizes the upper terminal of TDC pot 19 which is grounded at its lower terminal. The derived signal at slider 19' is fed through a proportioning resistance 20 to the amplifier 21 of the fuel flow system. The systems 14 and 15 referred to are diagrammatically indicated as conventional electric servo systems wherein the output of the system amplifier energizes a conventional servo motor-generator combination (M-G) for in turn operating other apparatus such as the signal generating pots, indicating instruments, etc. as described in the aforesaid Patent No. 2,798,308. Other systems are generally indicated as of this same type.

Referring again to the fuel flow system, signal pot 22 which is energized at its upper terminal by a constant voltage $-E$ and is grounded at its lower terminal, derives at its slider 22' a FF signal for use in the RPM (N) computing system hereinafter described. A simulated fuel flow indicator 23 is positioned according to computed fuel flow by the servo.

In addition to the power lever control signal at 17, the TDC system 14 is also responsive to a signal at the proportioning resistance 24 representing turbine outlet temperature (TOT) from the TOT system 25 that is also responsive through the N and FF systems to power lever positioning. The TOT system also produces the primary signal for controlling the torque (Q) system 26, all presently described. It will thus be seen that the power lever provides primary control signals for computing TDC, fuel flow, turbine outlet temperature and torque.

The computation of propeller RPM is accomplished by the N servo system 27. A summing amplifier 28 is connected to an input network including proportioning resistances 29, 30 and 31 for respective input signals presently described. The output of the amplifier representing the algebraic summation of these signals operates the servo motor set indicated for gang-control of signal generating pots 32, 33 and 34 respectively, and in addition a simulated RPM indicator 35.

Referring specifically to the N input signals, a signal Q representing engine shaft torque is fed to resistance 29 from the TOT signal pot 36, slider 36' and lead 37. The pot 36 is energized at its upper terminal by a voltage representing $+\delta/\sqrt{\theta}$, the lower terminal being grounded so that the resultant signal can be expressed as torque. The pot energizing signal may be produced as described in the aforesaid Patent No. 2,798,308, the factor $\delta$ representing relative pressure ratio (ram/ambient).

This torque signal is also fed by lead 38 to the input resistance 39 of the torque computer amplifier 40. The torque system comprises a conventional position servo having an answer pot 41 for producing the position signal at input resistance 42. This servo positions a simulated torque indicator 43.

Referring again to the N system, a signal representing air load (AL) at input resistance 30 is fed from pot 44 of the propeller blade angle ($\beta_p$) system 45. Pot 44 is energized by a voltage from N pot 34, that is in turn energized by a voltage representing $-\delta/\sqrt{\theta}$. Thus the N input voltage at 30 from lead 46 and slider 44' represents a function of airspeed and density, RPM and blade angle, and hence is representative of propeller load.

The third N input signal at 31 is derived from the $\beta_p$ pot 47 which is energized as shown by a voltage $+\delta/\sqrt{\theta}$. The resulting signal at slider 47' is fed by lead 48 to the N input. Accordingly, this signal is a function of airspeed and density and blade angle and hence is representative of the wind-milling force acting to turn the propeller in the same direction as engine torque. The N input signals are phased or polarized as indicated so as to correspond in sense to the shaft forces indicated in FIG. 1, so that the resultant of these forces represents a force tending either to increase or decrease the rate of shaft rotation or, if the resultant is zero, to hold the shaft at a constant RPM position. Thus, a change in reading of the RPM indicator 35 is produced only when the N input signals are unbalanced, and then in a direction corresponding to the predominating signal. This direction computation of propeller RPM is as previously pointed out independent of the type of prime mover used since it involves only the basic forces acting on the propeller shaft. These forces as will now be seen, can be computed separately according to the characteristics of the prime mover, etc.

The N computing system also produces a primary signal at TOT input resistance 49 of amplifier 50 for computing TOT. This signal over lead 51 is derived at slider 32' of N pot 32, that in turn is energized at its lower terminal over lead 52 by a FF signal from the fuel flow pot 22 at slider 22'. Thus, the primary TOT signal is properly a function of fuel flow and RPM. The other TOT input computing signal at resistance 53 represents the air temperature $T_2$ at the turbine compressor intake and may be produced as described in Patent No. 2,882,615 (FIG. 3 thereof) granted April 21, 1959, to W. H. Dawson, Jr. As previously indicated, a TOT signal for the TDC system is produced at slider 54' of the TOT pot 54 over lead 55. A simulated TOT indicator 25' is positioned by the TOT servo.

The $\beta_p$ system 45 above referred to is controlled jointly by the N system 27 and the condition lever 11. The $\beta_p$ servo amplifier 56 is responsive to two input signals, namely (1) a signal negative in sense at input resistance 57 by lead 58 from the slider 33' of the N pot 33 representing instant RPM, and (2) a signal positive in sense at input resistance 59 from the condition lever system 60, over lead 61 and switch 62 according to the position of the condition lever. The input at 57 therefore always represents instant RPM whereas the opposing signal at 59 depends on whether the switch 62 takes the signal from the condition lever pot 63 or a constant voltage source $+E$ as indicated.

For the purpose of simplicity, the condition lever is shown as operating the switch by a cam 64 that is arranged to throw the switch from the normal-operating-position contact $a$ to the reverse-position contact $b$ when the condition lever is moved to "Reverse." In the $a$ position the switch takes a signal from the scheduling pot 63 according to the condition lever position. The pot 63 is shown as energized at its upper terminal by a constant voltage $+E$ and grounded through a proportioning resistance 65. The lower range corresponding to reverse pitch is shorted at 66, the upper range representing the RPM control between predetermined minimum and maximum values.

In the $b$ or reverse position, the switch 62 takes the constant signal $+E$ for holding $\beta_p$ at a predetermined value corresponding to the value of signal $+E$.

It will be seen that since the variable control signal $(+)$ from pot 63 and the reverse signal $+E$ both oppose the RPM signal $(-)$, the $\beta_p$ servo will eventually position according to demand from the condition lever. That is, assuming that the RPM signal is either higher or lower in value with respect to the condition lever signal, the $\beta_p$ servo will adjust in a direction so as to reduce or increase the RPM signal through the $\beta_p$, RPM loop including the $\beta_p$ pots 44 and 47 and the N pot 33.

For a graphical illustration of the power lever and condition lever control of RPM and $\beta_p$, reference is had to FIG. 3, which illustrates the relationship between RPM and $\beta_p$ for different control conditions. The reference point is taken at 0° pitch or "flat" to correspond with the control system of FIG. 2.

For both reverse pitch (negative $\beta_p$) and positive pitch (forward thrust), the RPM schedule may be at so-called "low ground idle" RPM or "high ground idle" RPM. In practice, the "taxi" range is from low-idle to high-idle and the "Beta" or power lever control of blade pitch angle, includes both forward and reverse ranges of propeller thrust. During normal maneuvering and cruising, the RPM is maintained practically constant as the power lever calls for more or less propeller thrust by change in blade angle.

The present simultating system takes these characteristics sufficiently into account by the condition lever control of $\beta_p$ above described in combination with the power lever control of $\beta_p$ through the RPM system, RPM being a function of power lever setting, i.e. fuel flow FF through the TOT, N loop.

For a theoretical description of the RPM analog system operation, the following equations are used:

$$AL = K\sigma_a \cdot f(N) \cdot f(\beta_p) \quad \text{(Equation I)}$$

where $AL$ = propeller air constant load
$K$ = a constant
$\sigma_a$ = air density ratio (ambient)
$N$ = turbine RPM
$\beta_p$ = propeller blade angle $$Q_E = Kf(Q_E) \quad \text{(Equation II)}$$

where $Q_E$ = engine torque output.

$$N_W = Kf(V_T) \cdot f(\beta_p) \cdot f(\sigma) \quad \text{(Equation III)}$$

where $N_W$ = windmill effect on propeller
$V_T$ = true airspeed.

It will be seen from inspection that the three input signals for the N servo are represented by Equations I to III. Assigning proper directional signs as indicated in FIG. 1, and substituting, the following equation is obtained:

$$K\sigma_a \cdot f(N) \cdot f(\beta_p) = Kf(Q_E) \cdot Kf(V_T) \cdot f(\beta_p) \cdot f(\sigma)$$

$$\text{(Equation IV)}$$

This equation, as now apparent from the foregoing description, is continuously solved by the $\beta_p$ and N servo combination. During normal operation the $\beta_p$ servo will continuously regulate by balancing the above equation to maintain the RPM requested by the cockpit control. This basic computer arrangement which may be of A.C. or D.C. design as desired, is applicable to any and all propeller-type flight simulators, regardless of the type of propeller, propeller controls or basic prime mover.

Furthermore, since the various propeller control factors are directly inserted into the basic computing circuitry, not only can correct results be obtained but also a minimum number of terms can be used in the aerodynamic equations of the propeller, as will be apparent above.

Although various additional control features such as feather, low ground idle, high ground idle, reverse, etc., are in practice used with the $\beta_p$ computer circuitry to determine the blade angle servo shaft position when not in normal governing control, a detailed specific description of such is not necessary for a complete understanding of the present invention. Such details are therefore omitted in the interest of clarity of disclosure.

The invention also provides for proper dynamic and static characteristics. Assuming that the rate of angular change of the $\beta$ servo shaft is selected to correspond to the actual blade angle rate of the propeller to be simulated (by the conventional design of the servo reduction gearing, proportioning resistances and servo amplifier, etc.), the combined propeller and torque factors simulated then will, through the analog system above described automatically produce the proper dynamic and static instrument indications associated with propeller control manipulations. Such indications are most essential for on-ground training. Experience has shown that propeller control and operation with resultant instrument indications are of maximum interest to the flight crew handling the simulator. If the instruments, etc. do not reflect static and dynamic results of various propeller control manipulations, the flight crew at once suspect propeller malfunction and are reluctant to continue their training "flight."

Design flexibility is also an important factor in modern simulators. This is realized by the invention. For example, if another propeller having different aerodynamic characteristics is substituted in the actual aircraft, or if propeller control is changed, it is necessary merely to change in corresponding sense the computer functions (signal generators) or the equivalent component in the $\beta_p$ control system. The associated instrument indications will then automatically simulate the new design with no further changes in circuitry or apparatus necessary. In such cases, expensive wiring changes are not necessary and engineering-change time is reduced to a minimum.

Finally but not least in importance, the invention in practice has been found to give unexpectedly very high stability in all the dynamic and steady-state propeller RPM operations simulated. Since comparatively complicated servo loops in analog computers inherently introduce certain stability problems due to numerous electromechanical interactions, it will be seen that the invention by reason of its simplicity lends itself to both stable and realistic simulation and to low cost production.

It should be understood that this invention is not limited to specific details of construction and arrangement thereof herein illustrated, and that changes and modifications may occur to one skilled in the art without departing from the spirit of the invention.

We claim:

1. Electrical simulating apparatus for representing the performance of aircraft having a turbine-propeller combination including the indication of propeller shaft RPM, comprising a simulated condition lever and a simulated power demand lever, a source of signals representing simulated aerodynamic and ambient flight factors, a closed-loop analog servo system comprising a first servo system positioned to represent propeller shaft RPM, means primarily responsive to positioning of the power demand lever for producing a signal representing engine fuel flow, a second servo system positioned to represent propeller blade angle and responsive jointly to positioning of the condition lever and the RPM system, a third servo system positioned to represent a turbine temperature that is a manifestation of turbine power, said third system being responsive jointly to signals produced by the RPM and fuel flow systems, said third servo system using flight factor signals for producing a signal representing engine shaft torque, said second servo system using flight factor and RPM signals for producing a signal representing air load torque, said second system also using flight factor signals for producing a signal representing wind-milling torque, the aforesaid three torque signals jointly controlling the first system for indicating propeller shaft RPM.

2. In electrical apparatus for simulating the performance of aircraft having a gas turbine-propeller combination, a closed-loop analog servo system for computing and indicating propeller shaft RPM comprising simulated power and condition control means operable by the pilot, a propeller blade angle system responsive to adjustment of the condition means, an RPM servo system, a source of signals representing aerodynamic control factors incident to flight, means jointly responsive to signals representing respectively, positioning of the power control means, the simulated turbine outlet temperature (TOT) and aerodynamic factor signal for producing a signal representing fuel flow, means jointly responsive to the fuel flow and RPM signals and to a signal representing simulated turbine air intake temperature for producing a TOT signal, means jointly responsive to a TOT signal and aerodynamic factor signal for producing a torque signal representing in magnitude and sense engine shaft torque, means jointly responsive to signals from said blade angle and RPM systems and to an aerodynamic factor signal for producing a torque signal representing in magnitude and sense shaft torque due to propeller load, and means jointly responsive to positioning of said blade angle system and an aerodynamic factor signal for producing a torque signal representing in magnitude and sense shaft torque due to propeller wind-milling effect, said RPM system being jointly responsive to said three torque signals for indicating simulated shaft and propeller RPM.

References Cited in the file of this patent
UNITED STATES PATENTS 2,940,181   Lem ------------------ June 14, 1960
2,979,833   Goodwin -------------- Apr. 18, 1961